(12) United States Patent
Ramsesh

(10) Patent No.: US 7,243,538 B1
(45) Date of Patent: Jul. 17, 2007

(54) GAS FLOW SENSOR SYSTEM AND METHOD OF SELF-CALIBRATION

(75) Inventor: Anilkumar Ramsesh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 33 days.

(21) Appl. No.: 11/315,928

(22) Filed: Dec. 22, 2005

(51) Int. Cl.
*G01F 1/68* (2006.01)

(52) U.S. Cl. .................. 73/204.22; 73/204.21

(58) Field of Classification Search .............. None
See application file for complete search history.

(56) References Cited

U.S. PATENT DOCUMENTS

| | | | | |
|---|---|---|---|---|
| 4,213,335 | A | | 7/1980 | Peter et al. ............ 73/204 |
| 4,304,130 | A | | 12/1981 | Peter et al. ............ 73/204 |
| 4,332,157 | A | | 6/1982 | Zemel et al. ............ 73/26 |
| 4,669,301 | A | | 6/1987 | Kratt et al. ............ 73/118.2 |
| 5,635,136 | A | * | 6/1997 | Glaunsinger et al. ...... 422/88 |
| 5,731,510 | A | * | 3/1998 | Jones et al. ............ 73/23.31 |
| 5,814,281 | A | * | 9/1998 | Williams et al. ......... 422/88 |
| 6,279,394 | B1 | | 8/2001 | Svoboda et al. ......... 73/204.26 |
| 6,588,268 | B1 | * | 7/2003 | Yamagishi et al. ...... 73/204.26 |
| 6,604,417 | B1 | * | 8/2003 | Koike et al. ............ 73/204.22 |
| 6,647,777 | B1 | * | 11/2003 | Kotaka et al. ............ 73/204.26 |
| 7,084,378 | B2 | * | 8/2006 | Griffin et al. ............ 219/494 |

* cited by examiner

*Primary Examiner*—Harshad Patel
(74) *Attorney, Agent, or Firm*—Roberts & Roberts

(57) ABSTRACT

A gas flow sensor system, and method for gas flow rate measurement and self-calibration to overcome problems caused by degradation. Gas flow rate is accurately measured by determining the power dissipated at a constant differential temperature of a gas flow sensor, under conditions where its power dissipation is independent of its resistance. The gas flow sensor is adjusted to a predefined differential temperature compared to the temperature of the gas. In addition, variations in heat transfer coefficient (h) of a gas flow sensor are corrected by self-calibration of the gas flow sensor system. Experimentally established correction factors are applied to the gas flow sensor, to compensate for changes in its heat transfer coefficient (h) caused by degradation of the gas flow sensor. This offsets the adverse effects of use and aging of the gas flow sensor, thus reducing errors in gas flow measurement.

20 Claims, 6 Drawing Sheets

GAS FLOW SENSOR SYSTEM AND METHOD OF SELF-CALIBRATION

BACKGROUND OF THE INVENTION

1. Field of the Invention

The present invention relates to gas flow sensors, or exhaust gas mass flow sensors using thin or thick film resistor heaters, otherwise known as hot film anemometers. More particularly, the invention relates a gas mass flow sensor system and the self-calibration of gas mass flow sensors.

2. Description of the Related Art

Various applications require measurement of the mass flow rate of a gas or a mixture of gases at ambient or elevated temperatures. In particular, automotive applications measure exhaust gas mass flow rates or fresh air mass flow rates, for example in engine control.

Hot film anemometers are often used in gas flow measurement equipment, wherein they are suitably packaged within a protective housing, and placed in a gas exhaust pipe, or the like, within the gas flow path a definite direction, typically either parallel or perpendicular or at any angle to the gas flow. Previously, gas flow rates have been determined by first measuring an anemometer's resistance, then estimating its temperature from the resistance, and measuring its voltage or current to calculate velocity or average mass flow rate of the gas. However, certain problems arise when measuring the mass flow rate of hot exhaust gas whose temperature and density varies with engine performance and other operating conditions. Specifically, since exhaust gas temperatures vary over different operating ranges, error may be introduced into the gas flow rate measurement.

A variety of problems exist with conventional gas flow rate measurement techniques. For example, anemometers have been known to degrade in the exhaust gas environment over time, due to thermal cycling and soiling by dust transported by the exhaust gas. Because of this degradation, the heat transfer coefficient of the anemometer varies over time and introduces error into the gas mass flow rate measurement. Also, since an anemometer is present in a harsh and elevated temperature environment, electronic components attached thereto are placed outside this harsh environment and are connected to the anemometer via connection cables or the like. Variations in resistance of the anemometer and the connecting cables, especially during equipment changes, introduce error into gas flow rate measurements. That is, the anemometer and any connected electronics are not interdependent. Furthermore, mounting and orientation of the anemometer, i.e. in parallel to or in perpendicular or in any other fixed angle to gas flow, may also introduce error if it is not mounted in a gas tight, leak proof manner in its harsh, high temperature and high pressure environment. Another problem is that since the exhaust gas may comprise a mixture of different gases such as CO, $CO_2$, oxides of nitrogen ($NO_x$), HC, carbon soot, particulates, water, oxides of sulfur ($SO_x$), and the like, and have concentrations which vary by engine type, engine performance, fuel quality and operating conditions, the density of the exhaust gas varies and may cause errors in the gas mass flow rate measurement. Furthermore, errors in gas mass flow rate measurement may occur due to variation in diameter of exhaust gas pipes or manifolds and the location of the anemometer in the exhaust gas pipe.

The present invention provides a gas mass flow sensor system and a self-calibration method to overcome the problems of conventional sensors, particularly those caused by degradation due to long term use in harsh, corrosive, high temperature, high pressure, varying gas density exhaust gas environments.

It has been found that accurate calculation of gas flow rate can be achieved by determining the power dissipated in a gas flow sensor, rather than its voltage or current. This is because, under certain conditions, power dissipated in the gas flow sensor may be independent of the gas flow sensor's resistance, as well as the resistance of any cables or connections between the gas flow sensor and other components of a gas flow sensor system.

Also, power dissipated by the gas flow sensor varies with gas flow rate and gas temperature. Thus, when the gas flow sensor is maintained at a predefined differential temperature, as compared to the temperature of the gas or other medium, the power dissipated by the gas flow sensor is proportional to the gas flow rate. Thus, to reduce error in gas flow rate measurement, the present invention uses this method to determine power use or power dissipated by of the gas flow sensor, independently of its resistance.

Additionally, degradation of a gas flow sensor causes changes in heat transfer coefficient (h) of the sensor over time, resulting in changes in power dissipation of the gas flow sensor. The gas flow sensor system of this invention applies experimentally established correction factors to the gas flow sensor, to compensate for changes in the heat transfer coefficient (h) caused by degradation. This self-calibration offsets the adverse effects of use, aging, and the like of the gas flow sensor, thus reducing errors in gas flow measurement.

SUMMARY OF THE INVENTION

The invention provides a gas flow sensor system which comprises:

a) a sensor interface/control module;

b) a temperature sensor for measuring the temperature of a gas, electrically connected to the sensor interface/control module; and c) a gas flow sensor, electrically connected to the sensor interface/control module;

the sensor interface/control module comprising a microcontroller for monitoring the temperature of a gas as measured by the temperature sensor, and for adjusting the temperature of the gas flow sensor to a predefined differential temperature compared to the temperature of gas as measured by the temperature sensor.

The invention further provides a method for determining gas mass flow rate through a gas passageway, comprising:

i) providing a gas flow sensor system which comprises:
   a) a sensor interface/control module;
   b) a temperature sensor for measuring the temperature of a gas, electrically connected to the sensor interface/control module; and
   c) a gas flow sensor, electrically connected to the sensor interface/control module;
   the sensor interface/control module comprising a microcontroller for monitoring the temperature of a gas as measured by the temperature sensor, and for adjusting the temperature of the gas flow sensor to a predefined differential temperature compared to the temperature of gas as measured by the temperature sensor;

ii) measuring the temperature of a gas flowing through a gas passageway by means of the temperature sensor;

iii) monitoring the temperature of gas as measured by the temperature sensor, via the microcontroller of the sensor interface/control module; and iv) adjusting the temperature of the gas flow sensor to a predefined differential temperature compared to the temperature of gas as measured by the temperature sensor via the microcontroller of the sensor interface/control module.

The invention still further provides a method for self-calibration of a gas flow sensor system which comprises:

i) providing a gas flow sensor system which comprises:
  a) a sensor interface/control module;
  b) a temperature sensor for measuring the temperature of a gas, electrically connected to the sensor interface/control module; and
  c) a gas flow sensor having a heat transfer coefficient having an initial value, electrically connected to the sensor interface/control module;

the sensor interface/control module comprising a microcontroller for monitoring the temperature of a gas as measured by the temperature sensor, and for adjusting the temperature of the gas flow sensor to a predefined differential temperature compared to the temperature of gas as measured by the temperature sensor;

ii) measuring the temperature of a gas flowing through a gas passageway by means of the temperature sensor;

iii) monitoring the temperature of gas as measured by the temperature sensor, via the microcontroller of the sensor interface/control module;

iv) adjusting the temperature of the gas flow sensor to a predefined differential temperature compared to the temperature of gas as measured by the temperature sensor via the microcontroller of the sensor interface/control module;

v) determining the power dissipated by the gas flow sensor under conditions where gas is flowing through a gas passageway, with the sensor interface/control module;

vi) determining the power dissipated by the gas flow sensor under conditions where no gas flows through the gas passageway, using the sensor interface/control module;

vii) calculating any difference between power dissipated by the gas flow sensor in steps (v) and (vi); and viii) adjusting the value of the heat transfer coefficient of the gas flow sensor with the sensor interface/control module until power dissipation of the gas flow sensor is substantially equal under conditions wherein gas is flowing through the gas passageway, and under conditions wherein no gas flows through the gas passageway.

DETAILED DESCRIPTION OF THE INVENTION

Figure 1:
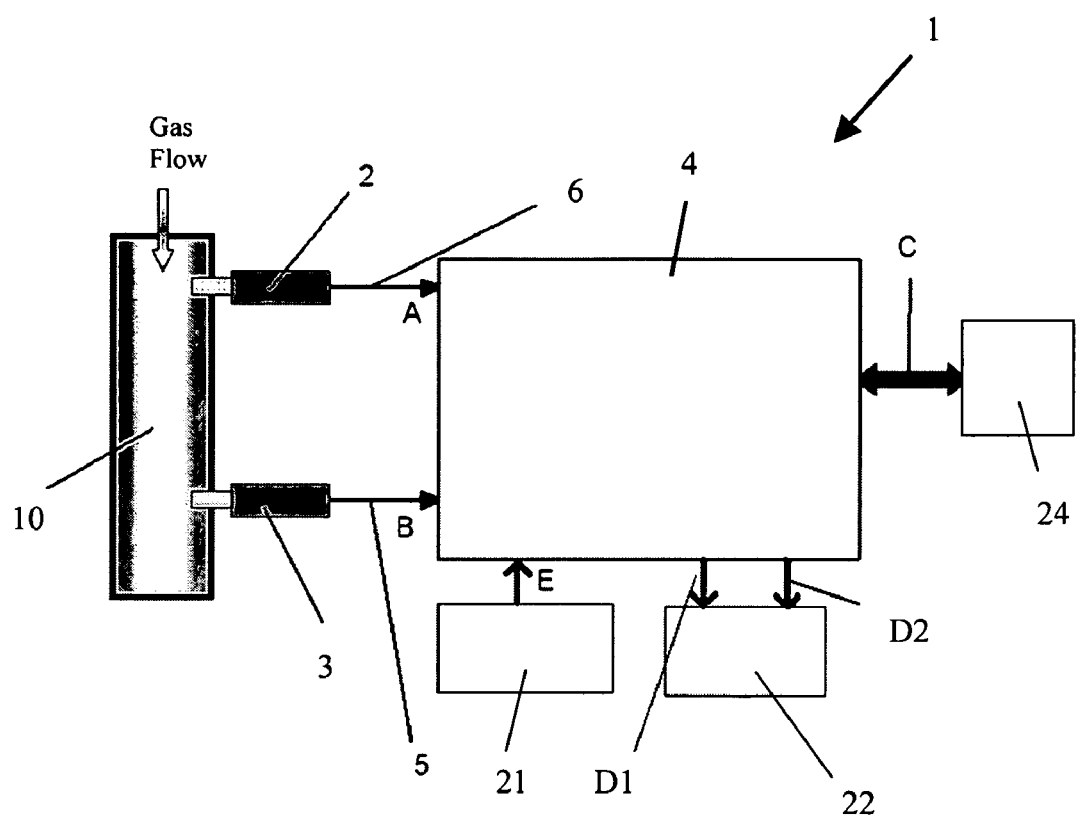
FIG. 1 shows a block schematic of a gas mass flow sensor system of the invention.

The invention provides a gas flow sensor system 1 shown in a first configuration in FIG. 1. As shown in FIG. 1, the gas flow sensor system 1 is connected to a gas passageway 10 such that the gas flow rate of a gas flowing through the gas passageway may be determined. A gas passageway 10 may comprise any suitable construction such as a tube, pipe, manifold or the like which is capable of transporting a gas.

The inventive gas flow sensor system 1 includes a sensor interface/control module 4 which is connected to a temperature sensor 2 and a gas flow sensor 3. The sensor interface/control module 4 serves as an interface between components of the system 1 and/or other optional externally connected components (discussed below), as well as serving as a control center of the gas flow sensor system 1. The sensor interface/control module 4 may comprise any suitable control electronics as necessary for controlling the various sensors and components of the gas flow sensor system 1. Examples of suitable control electronics of the sensor interface/control module 4 nonexclusively include data memories, data signal receivers, circuits, such as analog signal conditioning circuits, and firmware such as in microcontrollers, microprocessors, minicomputers, and the like. The sensor interface/control module 4 and its control electronics may comprise any suitable software or, codes necessary for the control and self-calibration, as described below, of the gas flow sensor system 1.

An important feature of the sensor interface/control module 4 is its ability to adjust the temperature of the gas flow sensor 3. This is preferably done via a microcontroller of the sensor interface/control module 4. Once a gas temperature is measured by the gas temperature sensor 2, the sensor interface/control module 4 is capable of processing temperature data relating to the gas temperature, and adjusting the operating temperature of the gas flow sensor 3 to a predefined differential temperature compared to the gas temperature as measured by the temperature sensor.

The sensor interface/control module 4 is connected to a power source. FIG. 1 shows an embodiment wherein the sensor interface/control module 4 is connected to the supply voltage of a power source 21, for example, through terminal E. Supply voltages may vary by application. Suitable supply voltages may range from about 1V to about 100 V, more preferably from about 10 V to about 100 V, and most preferably from about 20 V to about 100 V. In one embodiment the supply voltage is about 12 V, in another embodiment the supply voltage is about 24 V or more. The power source 21 may vary depending on the application. Examples of suitable power sources nonexclusively include DC power sources such as a battery or a regulated DC power supply. The power source 21 preferably regulates the sensor interface/control module's power, and protects the electronics of the sensor interface/control module 4 from reverse polarity, over voltage, electromagnetic interference (EMI), power surges, and the like.

As shown in FIG. 1, the gas flow sensor system 1 includes a temperature sensor 2 for measuring the temperature of a gas which is usually flowing through a gas passageway 10. The temperature sensor 2 is electrically connected to the sensor interface/control module 4. In one embodiment, a first end of the temperature sensor 2 is connected to the sensor interface/control module 4, and a second end of the temperature sensor 2 is connected to gas passageway 10. The temperature sensor 2 may be electrically connected to the sensor interface/control module 4 by any conventional means such as via wires, cables, or the like. In one embodiment, the temperature sensor is connected to the gas passageway 10 and/or the sensor interface/control module 4 via a threaded connection, or by welding or the like.

The temperature sensor 2 may comprise any suitable device capable of measuring the temperature of a gas, particularly of a flowing gas. The temperature sensor 2 is further capable of transmitting gas temperature data to the sensor interface/control module 4. Various temperature sensors are known in the art and may be purchased commercially, such as resistance temperature detectors (RTD), thermistors, thermocouples, semiconductors, and the like.

As also shown in FIG. 1, the gas flow sensor system 1 includes a gas flow sensor 3. The gas flow sensor 3 is electrically connected to the sensor interface/control module 4. In a preferred embodiment, a first end of the gas flow sensor 3 is connected to the sensor interface/control module 4, and a second end of the gas flow sensor 3 is connected to a gas passageway 10. The gas flow sensor 3 may be electrically connected to the sensor interface/control module 4 by any conventional means such as via wires, cables, or the like. In one embodiment, the gas flow sensor is connected to the gas passageway 10 and/or the sensor interface/control module 4 via a threaded connection, or by welding or the like.

Figure 4:
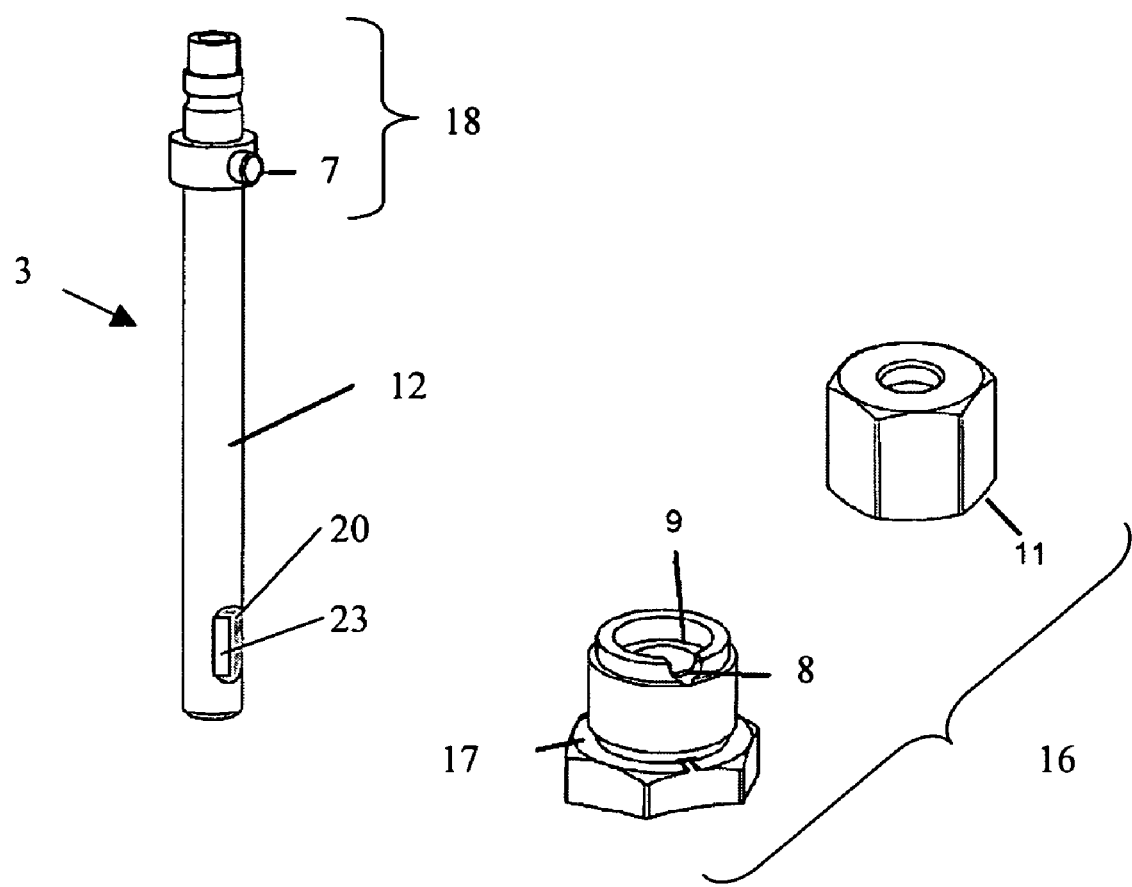
FIG. 4 shows a perspective view of examples of mounting device components.

The structure and use of gas flow sensors, or anemometers, are known by those skilled in the art. The gas flow sensor 3 of this invention preferably comprises an insulated substrate 23 encased within a protective housing 12, as shown in FIG. 4. Preferably, the insulated substrate 23 is thermally isolated from the protective housing 12, via a thermal insulator 15 as described below. This serves to reduce error caused by thermal energy loss of the gas flow sensor 3 due to conduction and the like.

The insulated substrate 23 preferably comprises an electrically and/or thermally insulated material. Suitable insulated materials nonexclusively include ceramic materials, glass, polymers, oxides of metals, and the like, and combinations thereof. A preferred insulated material comprises alumina. The insulated substrate of the gas flow sensor 3 preferably further comprises a heater element. Suitable heater element materials nonexclusively include platinum, nickel, nickel-chrome, or other similar metal thick-film or thin-film resistors, which are coated with a protective insulating layer such as glass or a ceramic glazing, or the like.

The protective housing 12 serves to encase and protect the insulated substrate 23 of the gas flow sensor 3. The protective housing 12 may be present in a variety of shapes, such as a hollow cylinder or the like, as shown in FIG. 4. The housing 12 preferably comprises metal, but may comprise any suitable protective material such as plastics or the like. Examples of suitable materials for the protective housing nonexclusively include aluminum, steel, such as stainless steels chromium steel, high-nickel steel, superalloys, and alloys and combinations thereof. Superalloys are specialty alloy materials known in the art which include a high nickel content and exhibit desirable properties such as high strength, high temperature resistance, oxidation resistance, and the like. An example of a superalloy material includes Inconel™ materials, which are commercially available.

Figure 6:
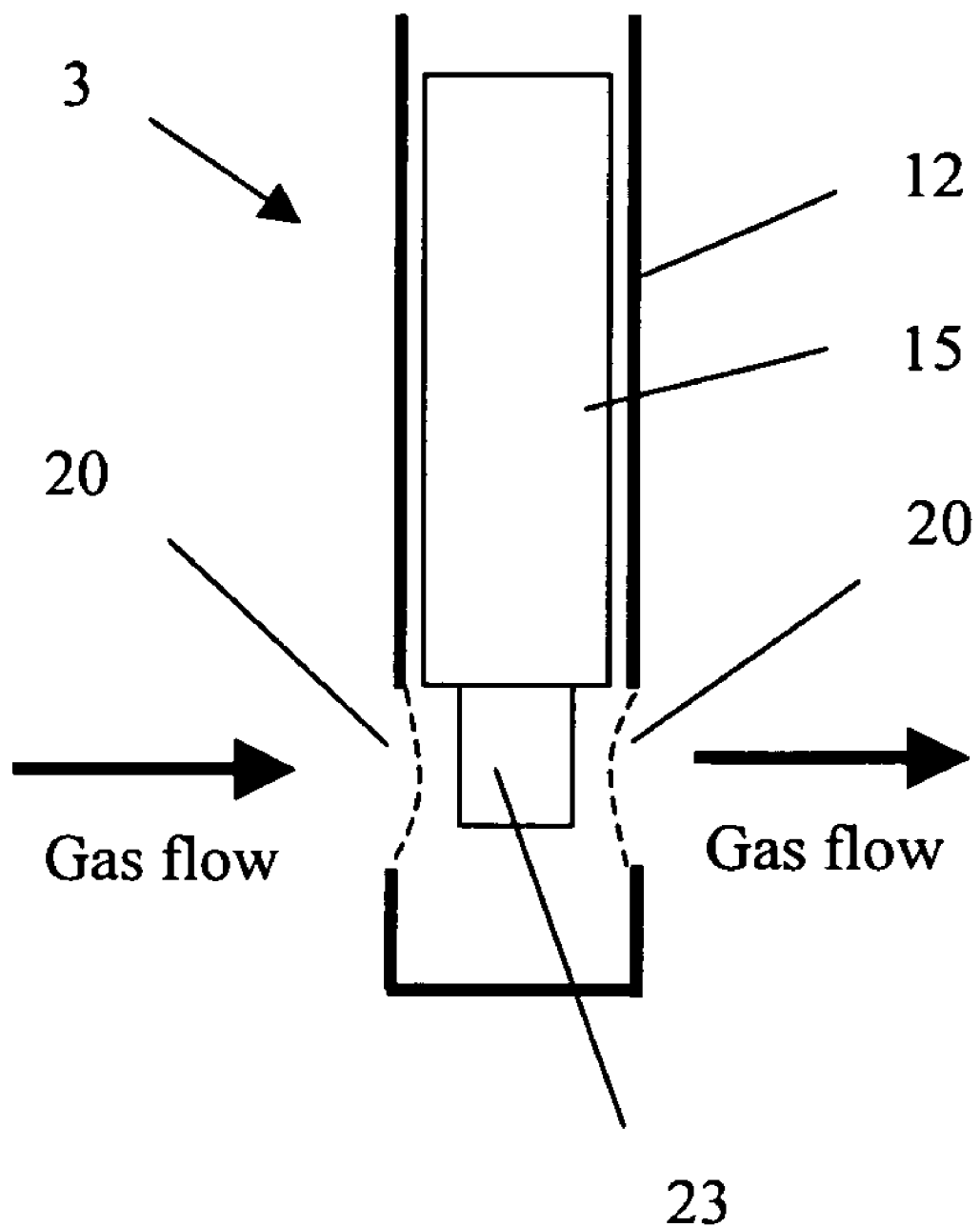
FIG. 6 shows side cut-away view of a gas flow sensor of the invention having windows on opposing sides of its protective housing.

As shown in FIG. 4, the protective housing 12 may further comprises at least one or more openings or windows 20. As shown in FIG. 6, a pair of windows 20, 20 is present on opposing sides of the protective housing 12. The windows 20, 20 serve to protect the structural integrity of gas flow sensor during gas flow, by channeling gas flow through and around the gas flow sensor 3, in a more stable, laminar flow. As shown in FIG. 6, the windows 20, 20 are preferably located at an end of the protective housing 12, but may optionally be located elsewhere on the protective housing. The windows 20, 20 may be of any suitable size as determined by those skilled in the art.

In another embodiment, the protective housing 12 further comprises a mounting device 18 for securely mounting the gas flow sensor 3 to an article such as a gas passageway 10 or the like. The mounting device 18 preferably allows for a tight, leak-proof mounting in high temperature, high pressure, corrosive environments so that the gas flow sensor's position, when attached to a gas passageway or the like, is fixed and stable. This reduces error in gas flow measurements. The mounting device 18 also serves to maintain the gas flow sensor 3 at a fixed direction or orientation with respect to gas flow direction. The gas flow sensor's output is function of the gas flow sensor's direction and the flow direction. Should the gas flow sensor's direction or orientation change in relation to gas flow direction, the effective area of heat transfer $A_e$ varies, and power dissipation will vary with regard to Formula 4, illustrated below. The use of a mounting device 18 may help reduce error caused by such directional and/or orientational changes in the gas flow sensor's position.

The mounting device 18 may comprise any suitable components for securing the gas flow sensor 3 in a fixed position relative to an article to which it is attached, such as a gas passageway 10. In one embodiment, shown in FIG. 4, the mounting device comprises a mounting stud 7 attached to the housing 12 of the gas flow sensor. In one embodiment the mounting stud 7 is present on the protective housing 12 such that the mounting stud 7 is aligned above the window 20, as shown in FIG. 4. The mounting device 18 may be attached to a complementary receiver unit 16 of an article to which the gas flow sensor 3 is to be mounted. The mounting stud 7 may be designed to fit together with a notch 8 of a washer 9, shown in FIG. 4, which washer 9 is a component of the receiver unit 16 of a gas passageway 10. The washer 9 may comprise copper or another suitable soft metal or like material, to provide a leak proof mounting of the gas flow sensor 3 to the gas passageway 10. The receiver unit 16 may also comprise a mounting nut 11, and a spring washer 17 to avoid unwinding of mounting nut 11 due to mechanical shock, vibration and/or thermal cycling. Other suitable components such as guide pins and the like may be included in the mounting device.

Figure 5A:
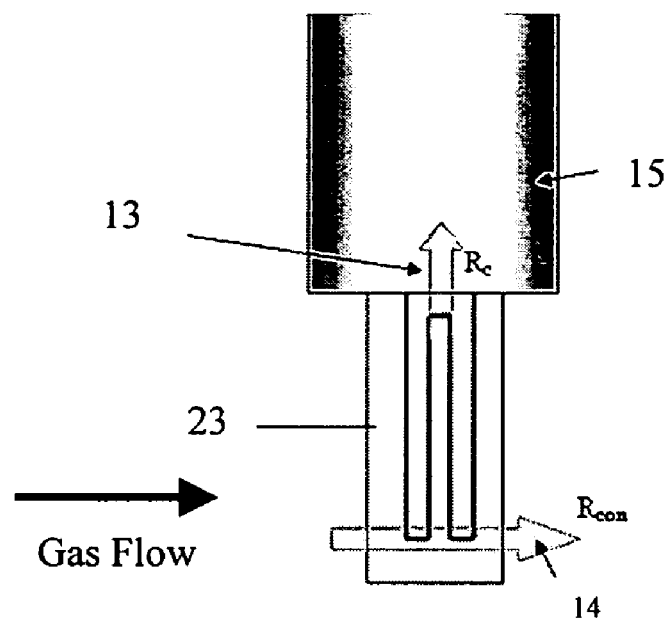
FIG. 5(a) shows a schematic representation of thermal paths through a gas flow sensor.

In another embodiment, the gas flow sensor 3 further comprises a thermal insulator 15, as shown in FIG. 5(*a*). The thermal insulator 15 may comprise a thermally insulated member, such as a sleeve or the like, which envelops the insulated substrate 23 of the gas flow sensor 3. The thermal insulator 15 may otherwise comprise a thermally insulated material which is wrapped around the insulted substrate 23 to thereby envelop it. The thermal insulator 15 may be present between the protective housing 12 and the insulated substrate 23, thereby thermally isolating the insulated substrate 23 from the protective housing 12. In another embodiment, the thermal insulator 15 envelops substantially all of the insulted substrate 23 except for a portion of the insulated substrate 23 which is to be in contact with a gas flow path, as shown in FIG. 5(a).

Figure 5B:
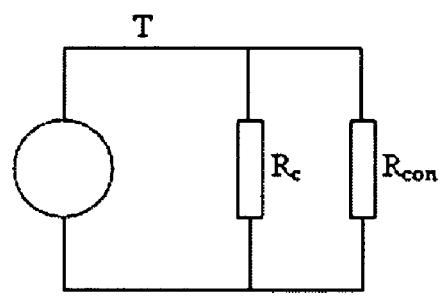
FIG. 5(b) shows a circuit equivalent of the thermal paths shown in FIG. 5(a).

The thermal insulator 15 is desirable since, when the gas flow sensor 3 is maintained at its differential temperature, heat is typically lost through two main paths, conduction 13 or convection 14, as shown in FIG. 5(a). Under low flow conditions, heat dissipates due to conduction across the shortest or least resistance path. If heat loss due to conduction is more than at low gas flow rates, error introduced in the measurement increases, since certain calculations such as Formula 4 (below) assume heat loss due to conduction to be zero. Also, at low gas flow rates, thermal resistance due to conduction has less than thermal resistance due to convection. As shown in FIG. 5(b), the circuit equivalent of FIG. 5(a), the conduction and convection resistance paths are shown in parallel. At temperature T, $R_c$ represents the conduction resistance path, and $R_{con}$ represents the convection resistance path. $R_c$ is typically less than $R_{con}$ at zero flow, and $R_c$ is typically greater than $R_{con}$ at actual gas flow.

Thus, the thermal insulator 15 serves to reduce power dissipated by the gas flow sensor 3 at no flow (zero flow), thereby increasing the dynamic range of the gas flow sensor 3 at given sensor specifications, and reducing errors in gas flow rate measurement at low flow and no flow. The thermal insulator 15 may comprise any suitable material which is thermally and/or electrically insulating at high temperatures. Examples of suitable insulating materials nonexclusively include ceramics such as porous alumina ceramic materials, low density aluminum oxide, polymers such as high temperature polymers, plastics, oxides of metal, clays, and the like, and combinations thereof.

As shown in the embodiment of FIG. 1, the temperature sensor 2 and the gas flow sensor 3 are attached to the sensor interface/control module 4 via connecting cables 5, 6 to terminals A and B of the sensor interface/control module 4, respectively. The sensor interface/control module 4 may be connected to a controlled area network 24 (CAN) or the like, via outputs such as terminal C, as shown in FIG. 1. The controlled area network 24 may serve to communicate data to an engine control unit, a monitoring module, or other external devices. In addition, as shown in FIG. 1, analog outputs 22 relating to gas temperature output, gas flow rate output, and the like, may be connected to the sensor interface/control module 4, via connections such as D1 and D2, respectively.

An objective of this invention is to accurately measure the gas flow rate of a gas which flows through a gas passageway or the like. As stated above, an accurate evaluation of gas flow rate can also be achieved by determining the power dissipation of the gas flow sensor 3, rather than its voltage or current. Power dissipated by the gas flow sensor varies with gas flow rate and temperature of the gas. By maintaining the gas flow sensor at a predefined differential temperature compared to the temperature of the gas, the power dissipated by the gas flow sensor is independent of resistance, independent of ambient gas temperature, and proportional to the gas flow rate. This method also reduces error and computation time in determining gas flow rate. Measuring the gas flow sensor's power use or dissipation, rather than voltage and current, also avoids interdependence of the sensors and the sensor interface/control module, such that various sensors can be connected to the sensor interface/control module with reduced error.

In use, the gas flow sensor system 1 is preferably positioned as shown in the embodiment of FIG. 1, such that the gas flow sensor 3 and the temperature sensor 2 are each connected to both a gas passageway 10 and a sensor interface/control module 4. Preferably, the gas flow sensor 3 is at least partially placed into a potential gas flow path. It is preferred that the gas flow sensor 3 is positioned such that it would be either parallel to gas flow or perpendicular to gas flow, when a flow is present.

The temperature of a gas within the gas passageway 10 is measured by the temperature sensor 2. Preferably, the temperature sensor 2 measures the temperature of a gas flowing through gas passageway 10. The temperature sensor may also measure the temperature of gas within the gas passage 1 under no flow (zero flow) conditions.

The temperature of the gas, as determined by the temperature sensor 2, is then preferably communicated to the sensor interface/control module 4. This may be done in a variety of ways, such as by sending a temperature data signal from the temperature sensor 2 to the sensor interface/control module 4. Preferably, the sensor interface/control module 4 receives such data relating to the gas temperature, and a microcontroller of the sensor interface/control module 4 monitors the gas temperature as measured by the temperature sensor. The microcontroller then adjusts the temperature of the gas flow sensor 3 to a predefined differential temperature compared to the temperature of gas as measured by the temperature sensor 2. Preferably, this predefined differential temperature is a temperature which is higher than the gas temperature as measured by the temperature sensor 2. For example, in one preferred embodiment of the invention, the gas flow sensor 3 is maintained at a predefined differential temperature of 50° C. above the gas temperature. If the gas temperature should rise to a higher temperature, the temperature of the gas flow sensor 3 is adjusted to rise to 50° C. above the higher gas temperature. If the gas temperature should fall to a lower temperature, the temperature of the gas flow sensor 3 is adjusted to fall to 50° C. above the lower gas temperature. In a preferred embodiment of the invention, where the gas temperature is $\leq 100°$ C., the gas flow sensor 3 is maintained at a predefined constant differential temperature of 150° C. above the gas temperature.

Upon maintaining the gas flow sensor 3 at its predefined differential temperature, power dissipated by the gas flow sensor at this adjusted temperature may be determined accurately, and thereafter the gas flow rate of gas flowing through the gas passageway 10 may be determined accurately, via the sensor interface/control module 4.

With heat transfer characteristics of the gas flow sensor 3 at a constant temperature, the power dissipated by the gas flow sensor 3 can be calculated using Formula 1:

$$P = HA_e \Delta T \qquad \text{(Formula 1)}$$

where:
P is the power dissipated by the gas flow sensor;
h is the heat transfer coefficient of the gas flow sensor;
$A_e$ is the effective area of heat transfer; and
$\Delta T$ is the difference between gas temperature and gas flow sensor temperature.

The heat transfer coefficient (h) of the gas flow sensor, according to King's law may be represented as Formula 2:

$$h = k_o + k_1 \left( \frac{d(\rho v)}{dt} \right)^{1/2} \qquad \text{(Formula 2)}$$

where:
$k_o$ and $k_1$ are constants dependent on the gas flow sensor dimensions;

ρ is gas density; and

υ is gas velocity.

Considering the cross sectional area ($A_p$) of a gas passageway in Formula 2, one arrives at Formula 3:

$$h = k_o + \frac{k_1}{A_p}\left(\frac{dm}{dt}\right)^{1/2} \quad \text{(Formula 3)}$$

where:

$A_p$ is the cross sectional area of the gas passageway; and dm/dt is the average mass flow rate of the gas.

Substituting Formula 3 into Formula 1, the power use of the gas flow sensor 3 is shown in Formula 4:

$$P = A_e \Delta T k_o + \frac{A_e \Delta T k_1}{A_p}\left(\frac{dm}{dt}\right)^{1/2} \quad \text{(Formula 4)}$$

The above calculations assume heat loss due to convection only.

An analysis of Formula 4 would show that where ΔT is maintained constant, and where the gas passageway 10 diameter or cross sectional area and effective area of heat transfer $A_e$ of the gas flow sensor 3 are accounted for, the power use of the gas flow sensor 3 is proportional to the average mass flow rate of the gas. Thus, based on Formula 4, power dissipated by the gas flow sensor would not be dependent on the resistances of the gas flow sensor or any connecting cables. This reduces error in determining mass flow rate.

In one embodiment, a feature of the invention is the self-calibration of desired components or parameters of the gas flow sensor system. That is, the gas flow sensor system is capable of adjusting itself to counteract the adverse effects of use, aging, degradation, and the like, thus reducing error in gas flow measurement. In a preferred embodiment of the invention, the gas flow sensor system 1 is capable of self-calibrating the heat transfer coefficient (h) of the gas flow sensor 3. The present invention is preferably capable of performing self-calibration periodically and automatically.

During no flow (zero flow) conditions, the power dissipated by the gas flow sensor depends on the heat transfer coefficient (h) of the sensor. Each gas flow sensor has a heat transfer coefficient having an initial value. Degradation of the gas flow sensor 3 due to thermal cycling, soot collection, and the like, causes the heat transfer coefficient (h) to vary over time, introducing error in the mass flow rate measurement. Thus, degradation of the gas flow sensor affects the power dissipated by the gas flow sensor. This appears as a variation in power dissipated by the gas flow sensor under flow conditions versus no flow (zero flow) conditions. In the present invention, a measured variation in power dissipation is corrected by software or codes embedded in firmware of the sensor interface/control module 4, specifically via software or codes embedded in the microcontroller of the sensor interface/control module 4.

Thus, the sensor interface/control module 4 of this invention is capable adjusting the value of the heat transfer coefficient of the gas flow sensor with the sensor interface/control module until power dissipation of the gas flow sensor is substantially equal under conditions wherein gas is flowing through the gas passageway, and under conditions wherein no gas flows through the gas passageway. Adjusting the value of the heat transfer coefficient of the gas flow sensor may be done via the software and firmware of the sensor interface/control module 4's components, while estimating or calculating the average gas mass flow rate under conditions wherein no gas flows through the gas passageway.

Under certain conditions, some small variation in power dissipation may be accepted, as may be determined by those skilled in the art. For example, a variation in power dissipation of about +/−3% of the base value may be considered acceptable. If the power dissipation variation at zero power is greater than the acceptable levels, for example +/−10% or more, then the gas flow sensor 3 would likely need cleaning or replacement. The sensor interface/control module 4 suitably adjusts the heat transfer coefficient constants, ($k_o A_e$) under no flow conditions and ($k_1 A_e$) under actual flow conditions in the computation of average mass flow rate to compensate for changes in the heat transfer coefficient (h) caused by degradation.

Figure 2:
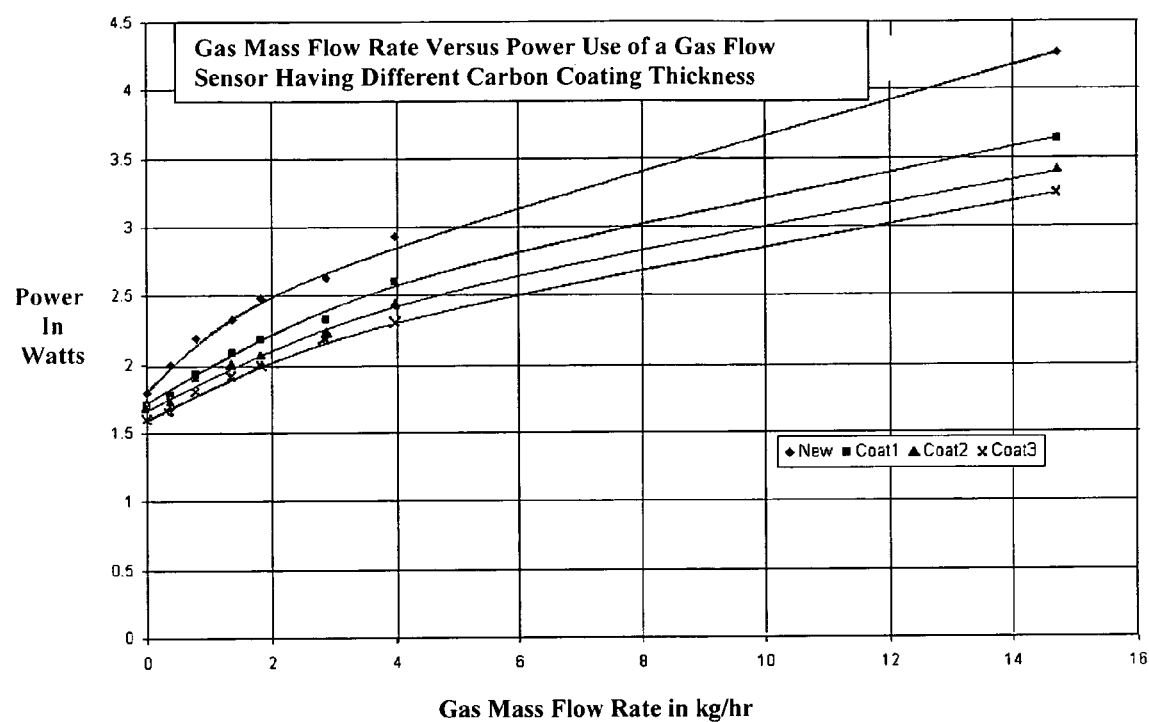
FIG. 2 shows a graphic representation of measured gas mass flow rate verses power use of a gas flow sensor, as a function of sensor degradation.

The data of FIG. 2 shows that as a gas flow sensor degrades, power dissipated is reduced. According to FIG. 2, at a particular gas mass flow rate, a new sensor utilizes more power than an old sensor, since a new sensor has a better heat transfer coefficient than an old sensor which has degraded. This graph shows experimental results wherein power dissipation or loss and a corresponding decrease in gas mass flow rate relate to the collection of carbon soot on a gas flow sensor over time.

It can be observed, in Formula 4, that when mass flow rate is zero, power dissipation is proportional to the product of $A_e$, ΔT and $k_o$. Power dissipation is designated herein as $P_o$. For a constant ΔT, the $P_o$ is proportional to the product of $A_e$ and $k_o$, which depends on the heat transfer coefficient. At point "A" in FIG. 2, the $P_o$ for a new gas flow sensor is more, while the $P_o$ for a degraded sensor is less. In this invention, the variation in $P_o$ is measured when gas flow is zero and the degradation of the gas flow sensor due to soot collection is estimated.

Figure 3:
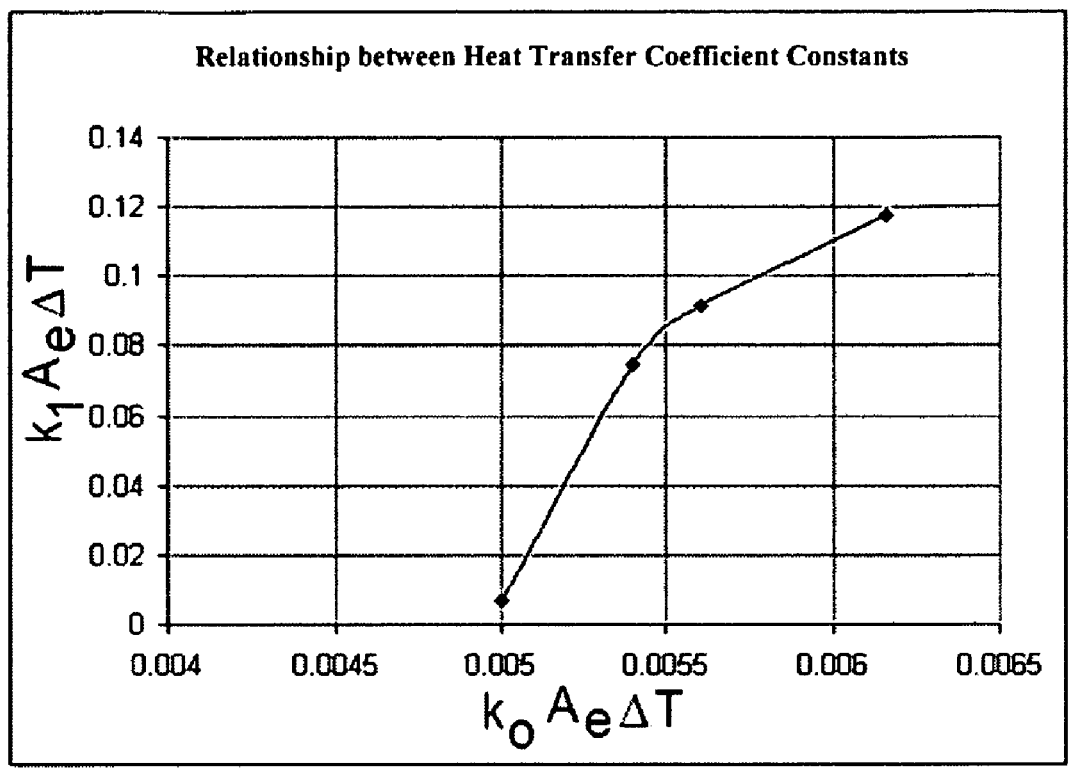
FIG. 3 shows a graphic representation of a measured relationship between heat transfer coefficient constants at zero flow and actual flow.

The relationship between the heat transfer coefficient constants ($k_o A_e$) under no flow conditions and ($k_1 A_e$) under actual flow conditions are established experimentally, as shown in FIG. 3. Thus, a measured power dissipation 'Po' at no flow, the heat transfer coefficient constant ($k_o A_e$) at no flow is computed and corresponding heat transfer coefficient constant ($k_1 A_e$) under actual flow is estimated from the experimentally established data shown in FIG. 3. These values of heat transfer coefficient under no flow and actual flow are compared with the corresponding bas value of new sensor stored in the memory of the microcontroller of sensor interface/control module 4. The difference between these constants and the base value of a new sensor equals the error due to degradation, and this error is compensated in software while computing actual mass flow rate using Formula 4. This is done online.

As stated above, if the measured error of the gas flow sensor 3 is beyond a determined limit, the sensor 3 should be cleaned or replaced. Furthermore, a gas flow sensor power measurement of zero during calibration would indicate complete failure of sensor. The gas flow sensor system 1 preferably comprises a warning indicator for indicating whether replacement of the gas flow sensor is necessary. The warning device may, for example, provide an audio, visual, or audio-visual signal to indicate that such replacement is necessary. In a preferred embodiment, the sensor interface/control module 4 comprises such a warning indicator.

Variations in other parameters such as gas density (ρ) and the diameter of the gas passageway 10 may also be corrected by varying constants of the gas flow sensor 3 via software embedded in the firmware of the sensor interface/control module 4, to reduce error.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A gas flow sensor system which comprises:
   a) a sensor interface/control module;
   b) a temperature sensor for measuring the temperature of a gas, electrically connected to the sensor interface/control module; and
   c) a gas flow sensor, electrically connected to the sensor interface/control module;
   the sensor interface/control module comprising a microcontroller for monitoring the temperature of a gas as measured by the temperature sensor, and for adjusting the temperature of the gas flow sensor to a predefined differential temperature compared to the temperature of gas as measured by the temperature sensor.

2. The gas flow sensor system of claim 1 wherein the gas flow sensor comprises a heater element.

3. The gas flow sensor system of claim 1 wherein the gas flow sensor comprises an electrically and/or thermally insulated substrate encased within a protective housing.

4. The gas flow sensor system of claim 3 wherein the electrically and/or thermally insulated substrate comprises alumina.

5. The gas flow sensor system of claim 3 wherein the protective housing comprises at least one window.

6. The gas flow sensor system of claim 3 further comprising a thermal insulator enveloping the insulated substrate.

7. The gas flow sensor system of claim 1 further comprising a mounting device for mounting the gas flow sensor to an article.

8. The gas flow sensor system of claim 7 wherein the mounting device is attachable to a complementary receiver unit of an article to which the gas flow sensor is to be mounted.

9. A method for determining gas mass flow rate through a gas passageway, comprising:
   i) providing a gas flow sensor system which comprises:
      a) a sensor interface/control module;
      b) a temperature sensor for measuring the temperature of a gas, electrically connected to the sensor interface/control module; and
      c) a gas flow sensor, electrically connected to the sensor interface/control module;
      the sensor interface/control module comprising a microcontroller for monitoring the temperature of a gas as measured by the temperature sensor, and for adjusting the temperature of the gas flow sensor to a predefined differential temperature compared to the temperature of gas as measured by the temperature sensor;
   ii) measuring the temperature of a gas flowing through a gas passageway by means of the temperature sensor;
   iii) monitoring the temperature of gas as measured by the temperature sensor, via the microcontroller of the sensor interface/control module; and
   iv) adjusting the temperature of the gas flow sensor to a predefined differential temperature compared to the temperature of gas as measured by the temperature sensor via the microcontroller of the sensor interface/control module.

10. The method of claim 9 further comprising the subsequent step of determining the power dissipated by the gas flow sensor at the adjusted temperature and thereafter determining the gas flow rate of the gas flowing through the gas passageway, with the sensor interface/control module.

11. The method of claim 9 wherein the gas flow sensor is adjusted to a predefined differential temperature which is above the temperature of the gas as measured by the temperature sensor.

12. The method of claim 9 wherein the gas flow sensor comprises an insulated substrate encased within a protective housing.

13. The method of claim 12 wherein the protective housing comprises at least one window.

14. The method of claim 12 wherein the gas flow sensor further comprises a thermal insulator enveloping the insulated substrate.

15. The method of claim 9 wherein the gas flow sensor further comprises a mounting device for mounting the gas flow sensor to an article.

16. A method for self-calibration of a gas flow sensor system which comprises:
   i) providing a gas flow sensor system which comprises:
      a) a sensor interface/control module;
      b) a temperature sensor for measuring the temperature of a gas, electrically connected to the sensor interface/control module; and
      c) a gas flow sensor having a heat transfer coefficient having an initial value, electrically connected to the sensor interface/control module;
      the sensor interface/control module comprising a microcontroller for monitoring the temperature of a gas as measured by the temperature sensor, and for adjusting the temperature of the gas flow sensor to a predefined differential temperature compared to the temperature of gas as measured by the temperature sensor;
   ii) measuring the temperature of a gas flowing through a gas passageway by means of the temperature sensor;
   iii) monitoring the temperature of gas as measured by the temperature sensor, via the microcontroller of the sensor interface/control module;
   iv) adjusting the temperature of the gas flow sensor to a predefined differential temperature compared to the temperature of gas as measured by the temperature sensor via the microcontroller of the sensor interface/control module;
   v) determining the power dissipated by the gas flow sensor under conditions where gas is flowing through a gas passageway, with the sensor interface/control module;
   vi) determining the power dissipated by the gas flow sensor under conditions where no gas flows through the gas passageway, using the sensor interface/control module;
   vii) calculating any difference between power dissipated by the gas flow sensor in steps (v) and (vi); and
   viii) adjusting the value of the heat transfer coefficient of the gas flow sensor with the sensor interface/control module until power dissipation of the gas flow sensor is substantially equal under conditions wherein gas is flowing through the gas passageway, and under conditions wherein no gas flows through the gas passageway.

17. The method of claim 16 wherein step (viii) is conducted by the microcontroller of the sensor interface/control module.

18. The method of claim 16 wherein the gas flow sensor comprises an insulated substrate encased within a protective housing.

19. The method of claim 18 wherein the protective housing comprises at least one window.

20. The method of claim 18 wherein the gas flow sensor further comprises a thermal insulator enveloping the insulated substrate.

* * * * *